US009745944B2

(12) United States Patent
Fujita

(10) Patent No.: US 9,745,944 B2
(45) Date of Patent: Aug. 29, 2017

(54) ENGINE STARTER UNIT

(71) Applicant: DENSO CORPORATION, Kariya, Aichi-pref (JP)

(72) Inventor: Tatsuya Fujita, Obu (JP)

(73) Assignee: DENSO CORPORATION, Kariya (JP)

( * ) Notice: Subject to any disclaimer, the term of this patent is extended or adjusted under 35 U.S.C. 154(b) by 53 days.

(21) Appl. No.: 14/656,081

(22) Filed: Mar. 12, 2015

(65) Prior Publication Data

US 2015/0260141 A1 Sep. 17, 2015

(30) Foreign Application Priority Data

Mar. 12, 2014 (JP) ................................ 2014-048621

(51) Int. Cl.

| | |
|---|---|
| ***H02P 9/00*** | (2006.01) |
| ***F02N 11/10*** | (2006.01) |
| *F02N 11/08* | (2006.01) |
| *F02N 15/06* | (2006.01) |

(52) U.S. Cl.

CPC ........ *F02N 11/105* (2013.01); *F02N 11/0803* (2013.01); *F02N 11/0844* (2013.01); *F02N 11/0848* (2013.01); *F02N 15/067* (2013.01); *F02N 2200/022* (2013.01); *F02N 2200/102* (2013.01); *F02N 2300/2011* (2013.01)

(58) Field of Classification Search

CPC ......... F02N 2300/2011; F02N 11/0848; F02N 11/0844; F02N 11/0803; F02N 11/105

USPC ................. 290/38 R, 38 C, 40 D; 74/7 D, 6; 123/179.3, 179.1

See application file for complete search history.

(56) References Cited

U.S. PATENT DOCUMENTS

| | | | | |
|---|---|---|---|---|
| 6,054,826 | A * | 4/2000 | Murakami ................ | B60L 3/04 318/434 |
| 6,202,608 | B1 * | 3/2001 | Yamaki ..................... | F01L 9/04 123/179.3 |
| 2008/0115753 | A1 | 5/2008 | Noguchi | |
| 2013/0276578 | A1 * | 10/2013 | Mizuno ............... | F02N 11/0844 74/7 A |
| 2015/0167613 | A1 | 6/2015 | Fujita et al. | |

FOREIGN PATENT DOCUMENTS

| | | | |
|---|---|---|---|
| CN | 201096050 | Y | 8/2008 |
| JP | 2008-128137 | A | 6/2008 |
| JP | 2011-220164 | A | 11/2011 |
| JP | 2015-135098 | A | 7/2015 |

* cited by examiner

*Primary Examiner* — Julio C. Gonzalez
(74) *Attorney, Agent, or Firm* — Oliff PLC

(57) ABSTRACT

An engine starter unit for starting an engine, includes a starter, a first controller, and a prohibiting means. The starter includes a motor generating a rotary force and a pinion transmitting the rotary force generated by the motor to the engine, the starter cranking the engine up to an engine speed of 450 rpm or more in a drive ON state. The first controller turns the starter into the drive ON state to make the starter start cranking in response to an ON operation of an ignition switch by a user. The prohibiting means prohibits the starter from being turned into the drive ON state again in response to another ON operation of the ignition switch for a prohibition duration after the first ON operation by the user.

6 Claims, 4 Drawing Sheets

ENGINE STARTER UNIT

CROSS-REFERENCE TO RELATED APPLICATION

This application is based on and claims the benefit of priority from earlier Japanese Patent Application No. 2014-48621 filed on Mar. 12, 2014, the description of which is incorporated herein by reference.

BACKGROUND

Technical Field

The present invention relates to an engine starter unit.

Related Art

Conventionally, as a method for starting an engine, after the engine is rotated at low-speed by a pinion-moving type starter which moves a pinion to an engagement position with a ring gear, fuel is injected into a combustion chamber, thereby speeding the engine up to an idling speed.

However, in this method, the engine is speeded up from the low-speed range (400 rpm or less) to the idling-speed by only combustion, which causes poor fuel efficiency. There is a need for a technique which can improve fuel efficiency by speeding the engine up to the idling-speed before fuel is injected.

As methods for speeding the engine up to the idling-speed before the injection of the fuel, there are a method for starting the engine using a motor and generator, a so-called ISG (integrated starter generator), and a method for starting the engine using an MG (motor generator).

However, there is a problem that ISGs or MGs are expensive. Further, they are alternating-current machines, accordingly they have poor start-up performance, compared with the pinion-moving type starter including a direct-current motor.

On the other hand, the applicant has suggested a high-speed cranking starter unit (JP2013-261092, which is not published) as a technique for cranking the engine up to a high-speed range using the pinion-moving type starter including the direct-current motor.

The high-speed cranking starter unit uses a starter including a direct-current motor having performance capable of cranking the engine up to the high-speed range of 450 rpm or more. The starter cranks the engine up to a given speed of 450 rpm or more in a predetermined duration Ta, and the starter is turned OFF before ignition. The predetermined duration Ta is set short, thereby the user is less likely to feel the cranking noise to be noisy.

However, in the high-speed cranking starter unit, since the cranking time is short, it might be difficult for the driver (the user) to recognize by sounds whether or not the engine has started. Since the engine is cranked up to the high-speed range in a short period, the cranking noise in the high-speed cranking starter unit is different from the conventional cranking noise when the engine is cranked up to the low-speed range. Accordingly, the user might be unlikely to recognize the noise as the cranking noise. In this case, it is difficult to recognize by sound whether the engine is normally cranked.

Although the engine has already started, the user might misguidedly believe the engine has not started yet and turn an ignition switch again during starting triggered by a first ON operation of the ignition switch, i.e. when the engine has been started in response to firstly turning the ignition switch (referred to IG switch) ON by the user, or when the engine is restarted from an idling stop state.

Since cranking is performed at the high-speed range of 450 rpm or more, if the starter is driven triggered by reoperation of the IG switch when the engine has been started, the ring gear and pinion are worn or generate noise.

In PTL1 (Japanese patent publication No. 2008-128137), in an idling stop system, when a restart requirement is issued during speeding down of the engine, the starter is prevented from being driven until the engine speed lowers to a given speed or less. However, prohibiting the starter from being driven during starting triggered by the ON operation and the method therefor has not been disclosed. There is no disclosure of a problem specific to the starter unit that cranks the engine up to a given speed of 450 rpm or more, the problem being that the user cannot recognize whether the engine has started.

SUMMARY

For solving the problems, the present invention has an object to prevent a starter unit, especially a high-speed cranking starter unit, from being worn and generating noise when the IG switch is operated again.

An engine starter unit for starting an engine according to an aspect of this disclosure includes a starter, a first controller, and a prohibiting means.

The starter includes a motor generating a rotary force and a pinion transmitting the rotary force generated by the motor to the engine, the starter cranking the engine up to an engine speed of 450 rpm or more in a drive ON state.

The first controller turns the starter into the drive ON state to make the starter start cranking in response to an ON operation of an ignition switch by a user.

The prohibiting means prohibits the starter from being turned into the drive ON state again in response to another ON operation of the ignition switch for a prohibition duration after the first ON operation by the user.

Alternatively, a prohibiting means prohibits the starter from being turned into the drive ON state again in response to an ON operation of an ignition switch by user for a prohibition duration after the restart requirement.

According to this disclosure, if the user cannot recognize by sound that the engine has started, and if the user turns the IG switch again after starting triggered by a first ON operation or after restarting, the starter is prohibited from being turned. This prevents the ring gear and the pinion from wearing in the driven starter.

DETAILED DESCRIPTION OF PREFERRED EMBODIMENTS

[Configuration of Embodiment]

Figure 1:
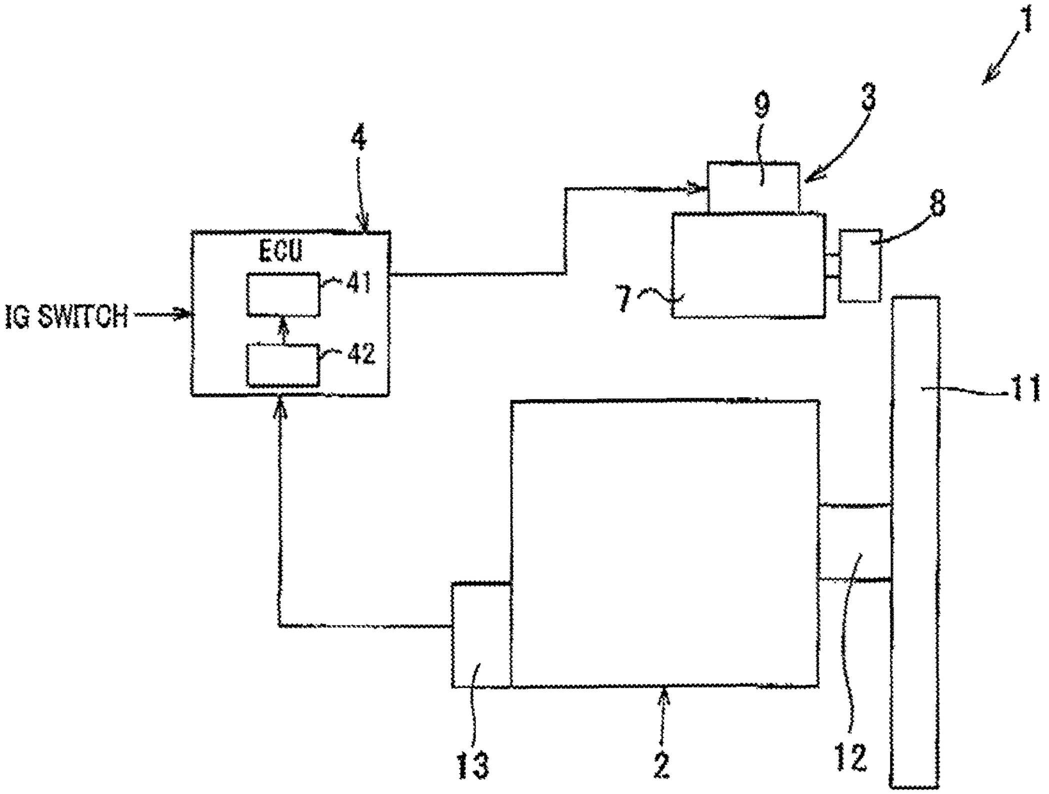
FIG. 1 is a schematic view showing a configuration of an engine starter unit according to an embodiment.

With reference to FIGS. 1 to 4, an embodiment of this disclosure is described.

An engine starter unit 1 is used in a vehicle including an idling stop system (stop and start system) for controlling automatically stop and restart of the engine. The engine starter unit 1 includes a starter 3 starting the engine 2, an ECU 4 which is an electronic control device controlling the operation of the starter 3, and so on.

The engine 2 of this embodiment is a gasoline engine of a spark ignition type.

The starter 3 is a pinion-moving type starter capable of cranking the engine 2 up to a high-speed range of 450 rpm or more. The starter 3 includes a motor 7, a pinion 8, an electromagnetic switch 9, and so on.

The motor 7 is a direct-current commutating motor including a field magnet having a permanent magnet (or field coil) disposed at an inner periphery of a yoke which doubles as a frame, an armature having an armature axis, and a commutator (not shown) provided around the armature axis, a brush (not shown) disposed at the outer periphery of the commutator, and the like.

The motor 7 can crank the engine 2 up to an idling peed.

The pinion 8 is a member that transmits the rotary force of the motor 7 to the engine, and, in this embodiment, is a gear having a small diameter and disposed on the output axis of the motor 7. The pinion 8 engages with a ring gear 11 to transmit the rotary force of the motor 7 to the crank shaft 12 of the engine 2 connected to the ring gear 11.

The electromagnet switch 9 is a moving means that pushes the pinion 8 through a shift lever and moves the pinion 8 to an engagement position where the pinion 8 engages with the ring gear 11. Further, the electromagnet switch 9 is a motor switch that switches the motor to ON or OFF by connecting or disconnecting the current path to the motor 7. In this embodiment, the electromagnet switch 9 performs the above actuations on the basis of signals from the ECU 4.

The ECU 4 is a controlling means for controlling supply of electric power to the starter 3 on the basis of the engine speed sensor 13 detecting the engine speed, an ignition switch, a brake sensor and the like. Specifically, the ECU 4 turns the starter 3 to drive ON state or drive OFF state, or controls the speed or torque of the motor 7 of the starter 3.

The engine starter unit 1 rotates the motor 7 with the pinion 8 engaging with the ring gear 11 to crank the engine 2. The engine starter unit 1 stops cranking the engine 2 by release the engagement of the pinion 8 and the ring gear 11 or by stopping the supply of the electric power.

That is, the ECU 4 switches the starter 3 to the drive ON state to crank the engine 2, when the ECU 4 receives a start command for the engine 2.

The drive ON state is a state where the pinion 8 moves to the engagement position to the ring gear 11 and engages with the ring gear 11, and where the motor 7 is energized, accordingly is a state for transmitting the rotary force of the motor 7 to the crank shaft 12.

The start command for the engine 2 is, for example, an engine start signal generated triggered by turning the IG switch ON (referred as ON operation of the IG key) when the engine is stopping. Turning the IG switch ON is, for example, turning a key of the vehicle inserted into an ignition key cylinder to a start position, or pushing a switch button for starting the engine.

In the vehicle including the idling stop system, generally, brake OFF operation dissolves the idling stop state, thereby the engine is restarted. Accordingly, the start command may be an engine start signal generated triggered by a restart requirement. The restart requirement is issued on the basis of detection of the brake OFF operation by the brake sensor. If the brake OFF operation is detected when the engine speed lowers for automatically stopping, the restart requirement is also issued.

When a predetermined condition for stopping cranking is satisfied, the ECU 4 returns the pinion 8 from the engagement position to the original position to release the engagement of the pinion 8 and the ring gear 11. Alternatively, the ECU 4 stops supply of the electric power to the motor 7 to stop cranking the engine 2. That is, the ECU 4 turns the starter 3 to the drive OFF state.

[Regarding High-Speed Cranking Start]

Figure 2:
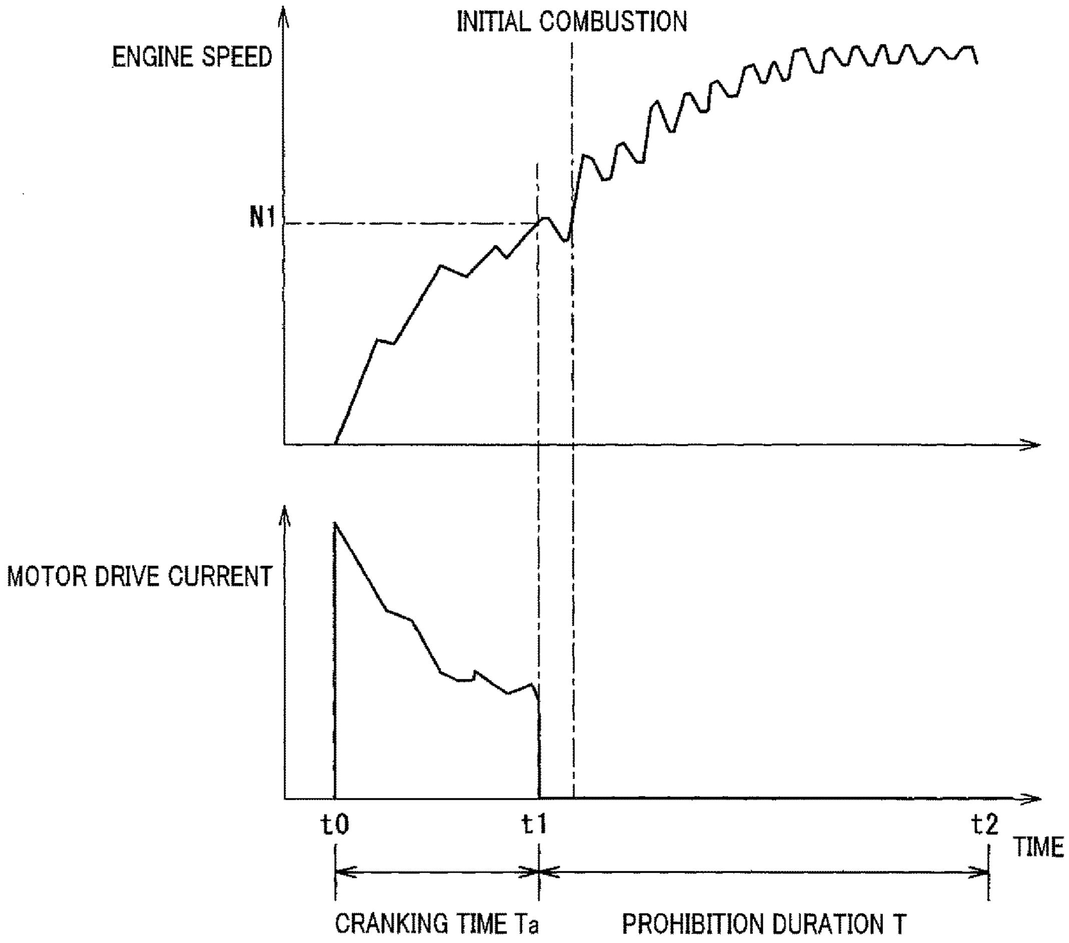
FIG. 2 is a chart showing engine speed, motor drive current and timing.

With reference to FIG. 2, high-speed cranking start is described.

The engine starter unit 1 switches the starter 3 to the drive ON state, in response to the engine start signal generated triggered by the ON operation of the IG switch when the engine is stopping. The starter 3 is controlled to crank the engine 2 up to a given engine speed of 450 rpm or more within a predetermined time Ta after starting cranking the engine 2.

For example, the engine speed N1 is equal to or smaller than an idling speed, and preferably equal to or larger than 500 rpm, If the engine speed N1 is equal to or larger than 500 rpm, the engine speed is kept equal to or larger than the resonance point of the engine 2.

The predetermined time Ta is a time period defined as a sounding duration of the cranking noise which does not bring the user a feeling of discomfort.

The feeling of discomfort due to the cranking noise depends on the sounding duration, i.e. cranking time. Especially, if the sounding duration is 0.2 seconds or less, the noise does not bring the feeling of discomfort, and is at a barely-troublesome noise level.

Accordingly, in this embodiment, the predetermined time Ta is set, for example, at approximately 0.2 seconds.

If the engine speed reaches the predetermined engine speed N1, the ECU 4 switches the starter 3 to the drive OFF state. That is, the starter 3 stops cranking. In this embodiment, the starter 3 is turned to the drive OFF state before the initial combustion, and the fuel is ignited and initially combusts while the engine 2 freewheels after stopping cranking.

That is, the engine starter unit 1 of this embodiment cranks the engine up to a given engine speed of 500 rpm or more for about 0.2 seconds, and immediately after that, the engine 2 starts.

Accordingly, the cranking noise sounds for about 0.2 seconds shortly, which makes it difficult to hear the cranking noise and recognize whether or not the engine has started.

Therefore, the user might recognize incorrectly that cranking is not performed or that the engine has not started, and might turn the IG switch on again although the engine 2 has started.

If notification of the start of the engine is displayed such that the user can see, the user might sensuously turn the IG switch again without seeing the display.

[Main Part of this Embodiment]

Figure 3:
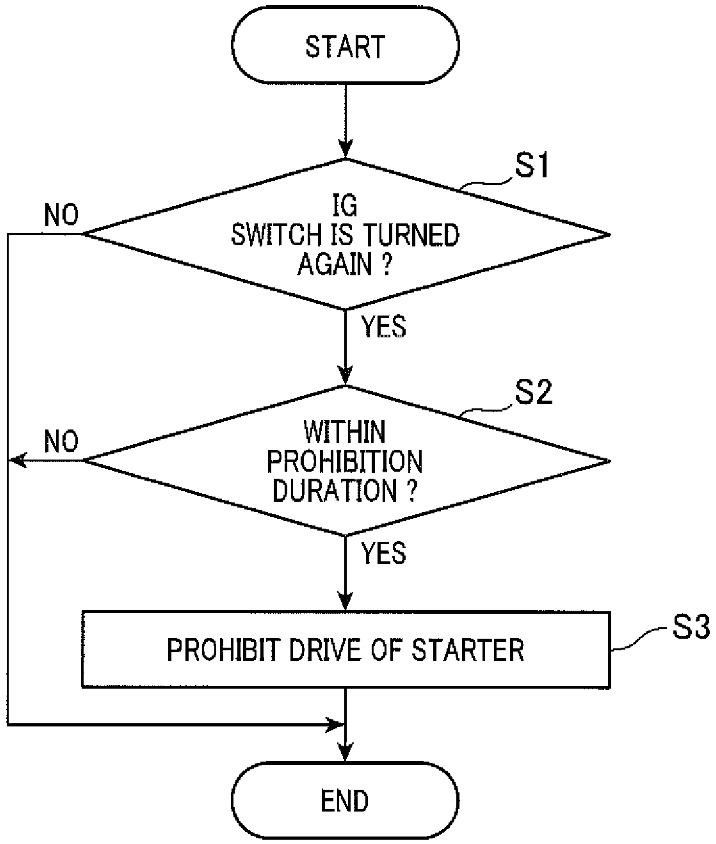
FIG. 3 is a flow chart showing a process flow of the starter unit.
Figure 4:
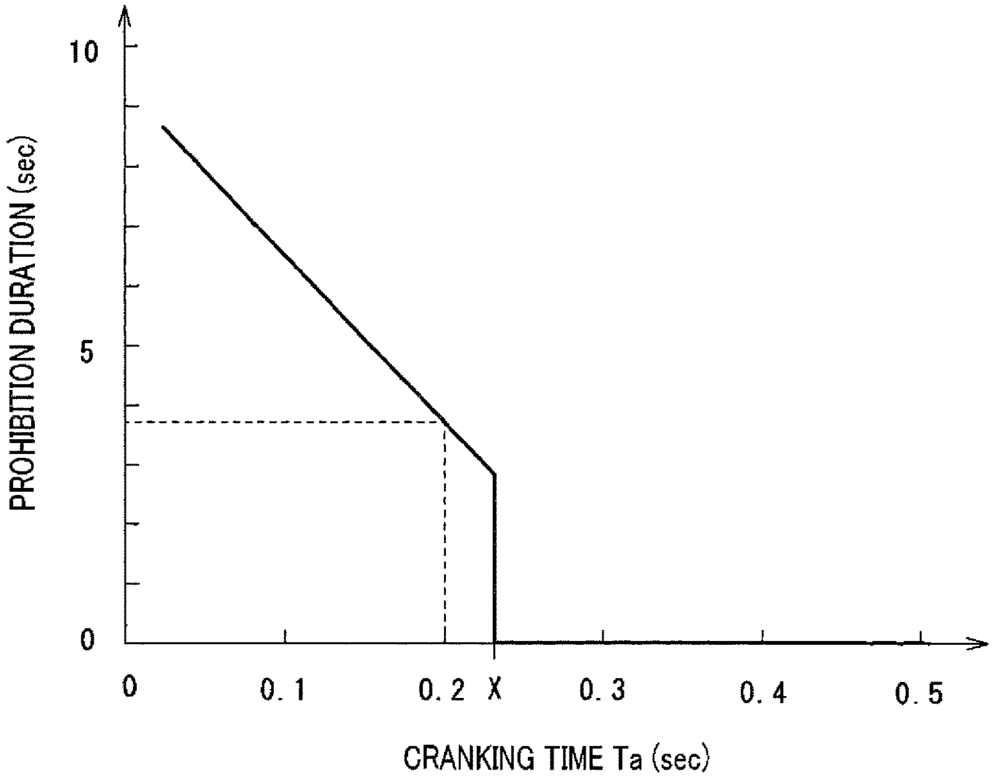
FIG. 4 is a chart of relation between cranking time Ta and prohibition duration T.

With reference to FIGS. 2 to 4, the main part of this embodiment is described.

The starter unit 1 of this embodiment includes a prohibiting means 41 for prohibiting the starter 3 from being turned to the drive ON state in response to another ON operation of the IG switch, when the engine has started.

The prohibiting means 41 set a prohibition duration T. In the prohibition duration T, the prohibiting means 41 prohibits the starter 3 from being turned to the drive ON state, even if the IG switch is turned ON again after a first ON operation of the IG switch and during starting triggered by the first ON operation of the ignition switch.

In this embodiment, the ECU 4 serves as the prohibiting means 41 and the first or second controller. The first controller and the second controller are collectively designated as a controller 42 in FIG. 1.

In this embodiment, a predetermined duration T from the end time t1 of cranking is set as the prohibition duration T. The electromagnetic switch 9 is kept off during the prohibition duration T, even if the IG switch is turned on. That is, pushing the pinion 8 and energizing the motor 7 is prohibited.

That is, the starter 3 is turned to the drive ON state to start cranking at time t0 in response to the engine start signal which has been generated based on the ON operation of the IG switch. Thereafter, the starter 3 rotates the engine 3 up to the predetermined speed N1 in the predetermined time period Ta, and stops cranking at the end time t1 of cranking. After that, until the prohibition duration T elapses, pushing the pinion 8 and energizing the motor 7 are prohibited, even when the ON operation of the IG key is performed again because of false recognition.

With reference to FIG. 3, here is described the flow of prohibiting the starter from being driven (being turned to the drive ON state).

In response to the engine start signal caused by the ON operation of the IG switch, the starter 3 is driven and cranks the engine up to the speed N1. Thereafter, the starter 3 is turned to the drive OFF to stop cranking. This state is the start point in this flow. The flow is repeatedly executed at a given period.

At first, in step S1, the ECU 4 determines whether or not the IG switch is turned to ON again. If the IG switch is turned to ON again, the flow proceeds to step S2. If the IG switch is not turned to ON again, there is no need for prohibiting the starter from being driven, the flow is terminated until the next iteration.

In step S2, the ECU 4 determines whether or not the prohibition duration T has elapsed from the end time t1 of cranking. If the prohibition duration T has not elapsed, the flow proceeds to step S3, the ECU 4 prohibits the starter 3 from being driven. After the prohibition duration T has elapsed, the flow is terminated.

The prohibition duration T is set on the basis of a relation map shown in FIG. 4.

According to FIG. 4, in a range where the cranking time Ta is smaller than a predetermined time X, the prohibition duration T is longer as the cranking time Ta is shorter. If the cranking time Ta is equal to or larger than the predetermined time X, the prohibition duration T is zero. The reason is that the cranking time Ta is the sounding duration. Accordingly, if the cranking time Ta is long, the user easily recognizes, on the basis of the cranking noise, that the engine is cranked. Therefore, the predetermined time X, a threshold, is defined on the basis of the sounding duration by which the user can recognize the engine is cranked.

In this embodiment, the predetermined time X is set at a given time within, for example, a range of not less than 0.2 seconds and less than 0.3 seconds.

That is, if the cranking time Ta of the engine starter unit 1 is equal to or larger than the predetermined time X, the prohibition duration T is set at zero. If the cranking time Ta is set within a range for providing the prohibition duration T (i.e., a range of smaller than the predetermined time X), the prohibition duration T is set on the basis of the relation map between the predetermined time X and the cranking time Ta where the prohibition duration T is longer as the cranking time Ta is shorter.

Further, if the cranking time Ta is 0.3 seconds or less, it is preferred that the prohibition duration T is 0.5 seconds or more. For example, in this embodiment, since the cranking time Ta is 0.2 seconds, the prohibition duration T is set at three seconds or more.

[Function and Effects of this Embodiment]

The engine starter unit 1 includes a prohibiting means 41. The prohibiting means 41 prohibits the starter 3 from being driven for the prohibition duration T, if the ON operation of IG switch is performed again after the first ON operation of the IG key.

This embodiment can prohibit the starter 3 from being driven, if the user cannot recognize the start of the engine by cranking noise and turns the IG switch. This can prevent the ring gear 11 and the pinion 8 from wearing caused by contacting with each other.

The prohibition duration T is set to be longer as the cranking time Ta is shorter.

The cranking time Ta is also the sounding duration of the cranking noise. It becomes harder to recognize the cranking noise as the sounding duration of the cranking noise is shorter. Accordingly, the user is likely to have a stronger impulse to operate the IG switch again. Therefore, the prohibition duration T is set to be longer as the cranking time Ta is shorter, which more reliably prevents the starter 3 from being driven incorrectly because of false recognition.

[Modifications]

Although the prohibition duration T starts from the end time t1 of cranking in the above embodiment, the prohibition duration T may start from the start time t0 of cranking.

The prohibition duration T is provided for preventing the starter from being driven when the IG switch is turned again during starting triggered by the first ON operation in the above embodiment. It is not limited to the case during starting triggered by turning the IG key, but the prohibition duration T may be applied when the engine is restarted from an idling stop state. That is, when the engine is restarted after automatically stopping of the engine or from lowering state of the engine speed, if the IG switch is turned to ON after the restart requirement, the prohibition duration T may be given for prohibiting the starter 3 from being driven.

Also, at the restart, although cranking starts, the user cannot recognize the cranking noise, might incorrectly believe that cranking has not started, and might turn the IG key. Accordingly, the same effects as the above embodiment can be obtained by providing the above prohibition duration T at the restart.

The electromagnet switch 9 may include a common solenoid or respective solenoids for pushing the pinion 8 and for switching ON/OFF state (supplying state) of the electric current to the motor 6.

Though the invention has been described with respect to the specific preferred embodiments, many variations and modifications will become apparent to those skilled in the art upon reading the present application. It is therefore the intention that the claims be interpreted as broadly as possible in view of the prior art to include all such variations and modifications.

The invention claimed is:

1. An engine starter unit for starting an engine, comprising:

a starter that includes a motor generating a rotary force and a pinion transmitting the rotary force generated by the motor to the engine, the starter cranking the engine up to an engine speed of 450 rpm or more in a drive ON state; and a controller that:

turns the starter into the drive ON state to make the starter start cranking in response to a first ON operation of an ignition switch;

turns off the starter into a drive OFF state to stop the cranking when the engine is cranked up to the engine speed of 450 rpm or more;

determines whether a second ON operation of the ignition switch is performed;

determines whether a predetermined prohibition duration has elapsed since the stop of the cranking when it is determined that the second ON operation is performed; and prohibits the starter from being shifted to the drive ON state in response to the second ON operation of the ignition switch when it is determined that the predetermined prohibition duration has not elapsed since the stop of the cranking.

2. The engine starter unit according to claim 1, wherein the predetermined prohibition duration is set longer as a cranking time of the cranking in response to the first ON operation decreases.

3. The engine starter unit according to claim 1, wherein the predetermined prohibition duration starts from a start time of the cranking in response to the first ON operation or from an end time of the cranking in response to the first ON operation.

4. An engine starter unit for a vehicle automatically stopping and restarting an engine, comprising:

a starter that includes a motor generating a rotary force and a pinion transmitting the rotary force generated by the motor to the engine, the starter cranking the engine up to an engine speed of 450 rpm or more in a drive ON state; and a controller that:

turns the starter into the drive ON state to make the starter start cranking in response to a restart requirement for the engine;

turns off the starter into a drive OFF state to stop the cranking when the engine is cranked up to the engine speed of 450 rpm or more;

determines whether an ON operation of the ignition switch is performed;

determines whether a predetermined prohibition duration has elapsed since the stop of the cranking when it is determined that the operation is performed; and prohibits the starter from being shifted to the drive ON state in response to the ON operation of the ignition switch when it is determined that the predetermined prohibition duration has not elapsed since the stop of the cranking.

5. The engine starter unit according to claim 4, wherein the predetermined prohibition duration is set longer as a cranking time of the cranking in response to the first ON operation decreases.

6. The engine starter unit according to claim 4, wherein the predetermined prohibition duration starts from a start time of the cranking in response to the restart requirement or from an end time of the cranking in response to the restart requirement.

* * * * *